United States Patent [19]

Chen

[11] Patent Number: 5,813,436
[45] Date of Patent: Sep. 29, 1998

[54] FAUCET DEVICE

[76] Inventor: Chiao-Lin Chen, 3, Lane 230, Dong Kuang Rd., Her Meei, Chang Hua Hsien, Taiwan

[21] Appl. No.: 888,869

[22] Filed: Jul. 7, 1997

[51] Int. Cl.$^6$ .............................. E03C 1/04; F16K 11/14
[52] U.S. Cl. .............................. 137/801; 4/677; 137/360; 137/597; 137/867
[58] Field of Search ............................... 4/677; 137/360, 137/597, 801, 867

[56] References Cited

U.S. PATENT DOCUMENTS

| | | | |
|---|---|---|---|
| 5,608,928 | 3/1997 | Wang | 137/801 X |
| 5,730,184 | 3/1998 | Monch | 137/597 |

Primary Examiner—Gerald A. Michalsky
Attorney, Agent, or Firm—Peterson, Wicks, Nemer & Kamrath

[57] ABSTRACT

A faucet device has a main body, a handle disposed on the main body, a positioning hole formed on the main body, an annular cushion disposed on the main body, a plunger inserted in the positioning hole, a valve seat covering the positioning hole, and a control device connected to the valve seat. The main body has a water outlet, a water passage communicating with the water outlet, a water inlet opening communicating with the water passage, and a water channel communicating with the water inlet opening. The plunger has a threaded end, a packing ring, and a plug packing disposed on a lower end of the plunger. The control device has a control rod which has a cylinder end engaging with the threaded end of the plunger. The plunger is inserted through the valve seat and an upper portion of the plunger is extended out of the valve seat.

2 Claims, 5 Drawing Sheets

FAUCET DEVICE

BACKGROUND OF THE INVENTION

The present invention relates to a faucet device. More particularly, the present invention relates to a faucet device which has a control device to insure that water will flows into a faucet and water will not flow into a shower head while the faucet device is turned on.

A conventional faucet device comprises a shower head and a faucet. However, water will flow into the shower head while the faucet device is turned on. When the hot water flows into the shower head, the user may be scalded accidently.

SUMMARY OF THE INVENTION

An object of the present invention is to provide a faucet device which has a control device to insure that water will flows into a faucet and water will not flow into a shower head while the faucet device is turned on.

Accordingly, a faucet device comprises a main body, a handle disposed on the main body, a positioning hole formed on the main body, a plunger inserted in the positioning hole, a valve seat covering the positioning hole, and a control device connected to the valve seat. The handle has a lateral seat and a slot hole. The main body has a water outlet, a water passage communicating with the water outlet, a water inlet opening communicating with the water passage, a water channel communicating with the water inlet opening, and a water inlet hole communicating with the positioning hole. The plunger has a threaded end, a packing ring, and a plug packing disposed on a lower end of the plunger. The valve seat has a flange, a cubic portion disposed on the flange, a threaded portion formed on a periphery of the valve seat, a plurality of circular holes formed on the periphery of the valve seat, and a through hole. The plunger is inserted through the through hole and an upper portion of the plunger is extended out of the valve seat. A washer surrounds the threaded portion and is blocked by the flange. The plug packing plugs a lower end of the valve seat. The control device has a hollow head and a control rod. The hollow head has an interior and a pin hole. An upper portion of the control rod is inserted in the interior of the hollow head. The upper portion of the control rod passes through the slot hole. The control rod has a round hole matching the pin hole and a cylinder end engaging with the threaded end of the plunger. A pin fastens the hollow head and the control rod via the pin hole and the round hole.

DETAILED DESCRIPTION OF THE INVENTION

Figure 1:
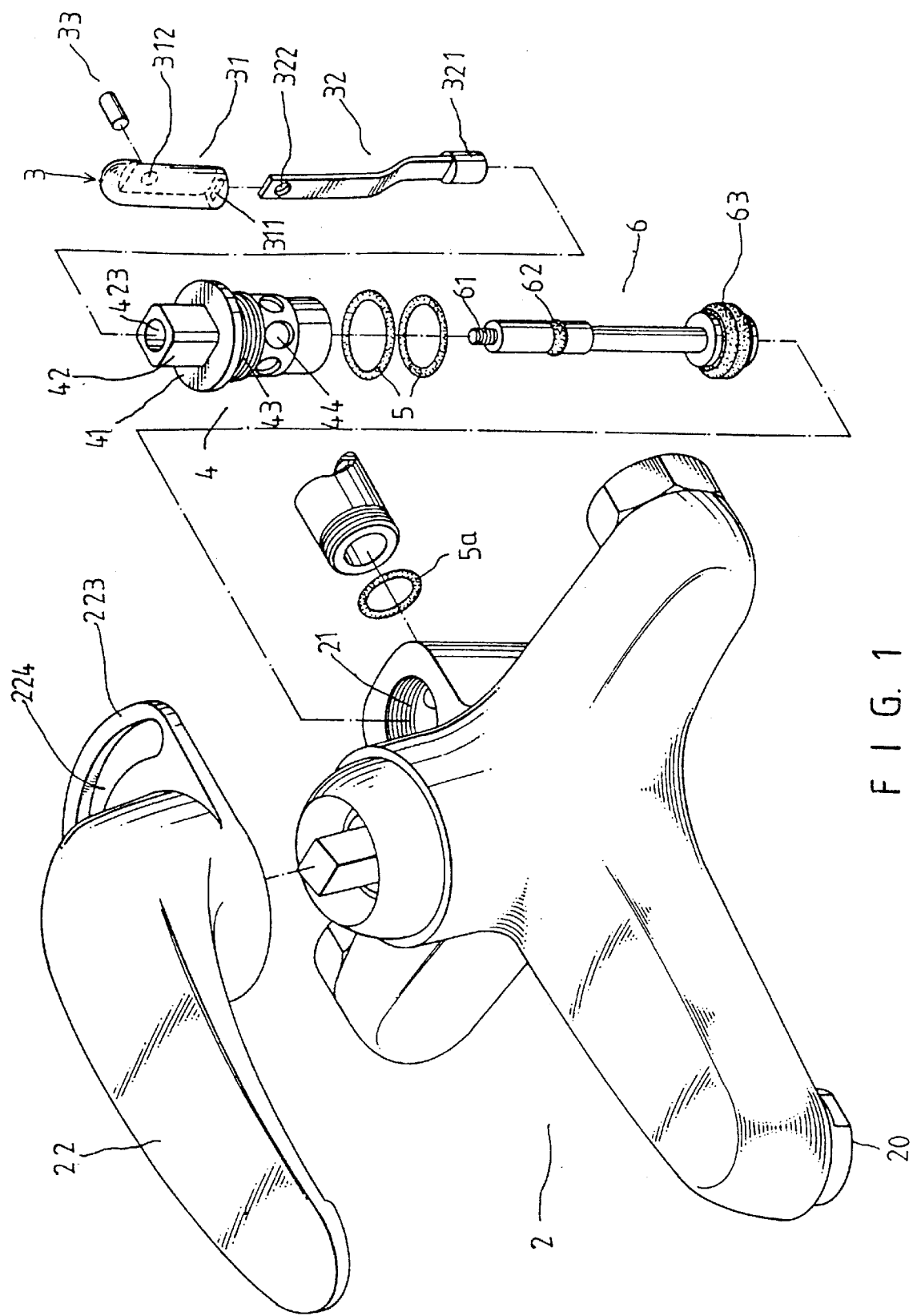
FIG. 1 is a perspective exploded view of a faucet device of a preferred embodiment in accordance with the present invention.
Figure 2:
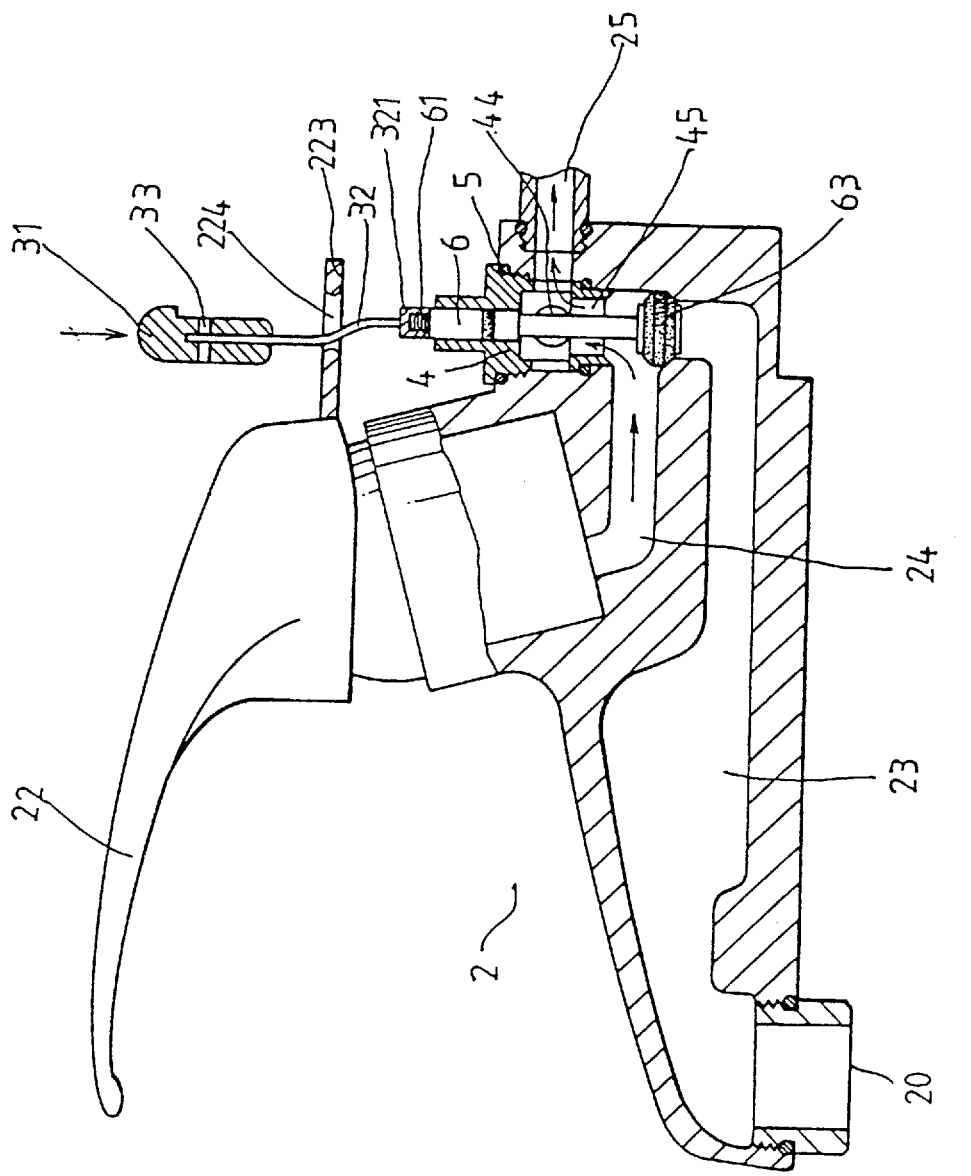
FIG. 2 is a sectional schematic view illustrating an operation of a faucet device of a preferred embodiment in accordance with the present invention.
Figure 3:
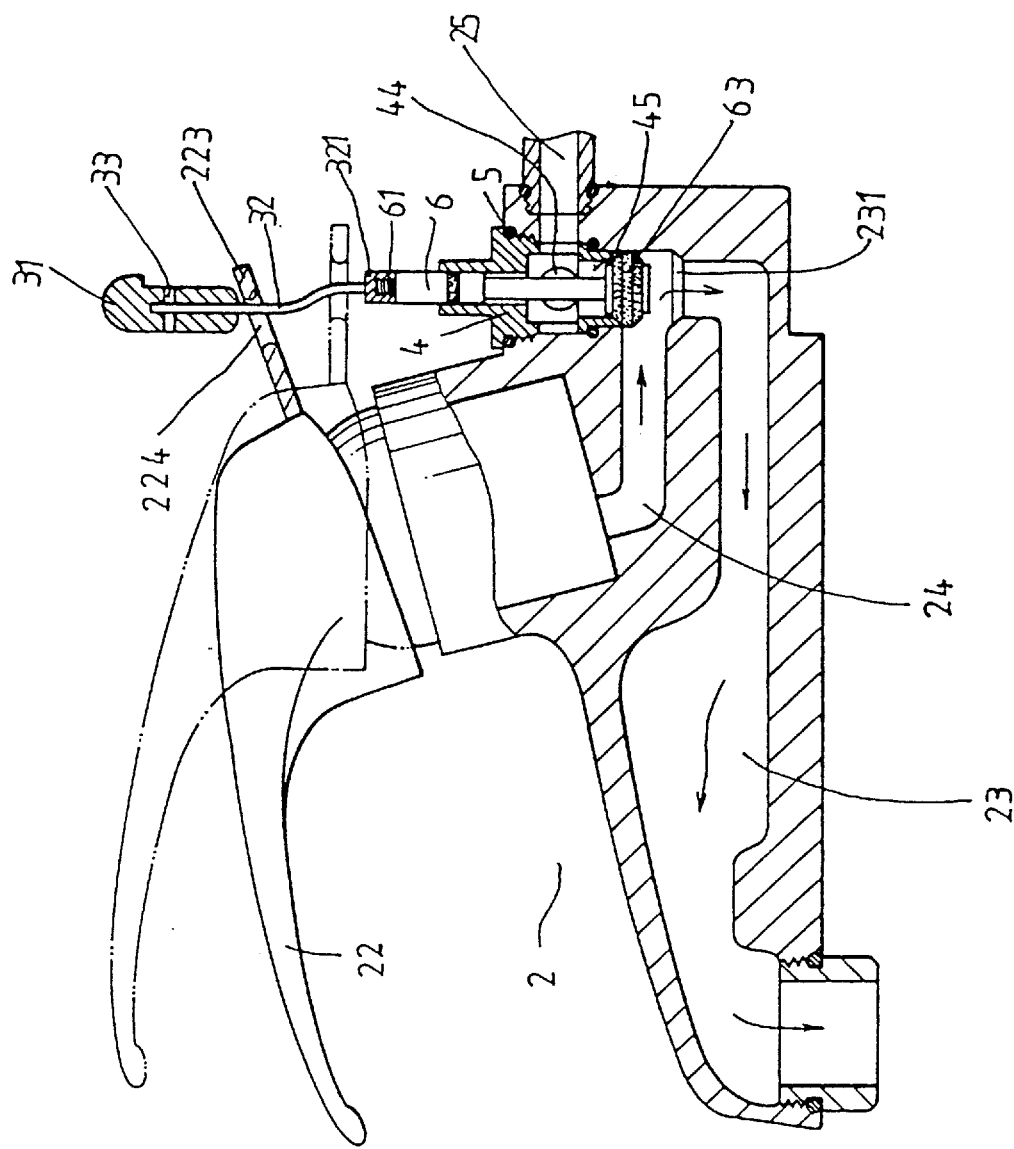
FIG. 3 is a sectional schematic view illustrating another operation of a faucet device of a preferred embodiment in accordance with the present invention.

Referring to FIGS. 1 to 3, a faucet device comprises a main body 2, a handle 22 disposed on the main body 2, a positioning hole 21 formed on the main body 2, an annular cushion 5a disposed on the main body 2, a plunger 6 inserted in the positioning hole 21, a valve seat 4 covering the positioning hole 21, and a control device 3 connected to the valve seat 4. The handle 22 has a lateral seat 223 and a slot hole 224. The main body 2 has a water outlet 20, a water passage 23 communicating with the water outlet 20, a water inlet opening 231 communicating with the water passage 23, a water channel 24 communicating with the water inlet opening 231, and a water inlet hole 45 communicating with the positioning hole 21. A water tube 25 is connected to the main body 2. The annular cushion 5a is disposed between the water tube 25 and the main body 2. The water tube 25 communicates with the positioning hole 21. The plunger 6 has a threaded end 61, a packing ring 62, and a plug packing 63 disposed on a lower end of the plunger 6. The valve seat 4 has a flange 41, a cubic portion 42 disposed on the flange 41, a threaded portion 43 formed on a periphery of the valve seat 4, a plurality of circular holes 44 formed on the periphery of the valve seat 4, and a through hole 423. The plunger 6 is inserted through the through hole 423 and an upper portion of the plunger 6 is extended out of the valve seat 4. A washer 5 surrounds the threaded portion 43 and is blocked by the flange 41. The plug packing 63 plugs a lower end of the valve seat 4. The control device 3 has a hollow head 31 and a control rod 32. The hollow head 31 has an interior 311 and a pin hole 312. An upper portion of the control rod 32 is inserted in the interior 311 of the hollow head 31. The upper portion of the control rod 32 passes through the slot hole 224. The control rod 32 has a round hole 322 matching the pin hole 312 and a cylinder end 321 engaging with the threaded end 61 of the plunger 6. A pin 33 fastens the hollow head 3 and the control rod 32 via the pin hole 312 and the round hole 322.

Referring to FIG. 3 again, the handle 22 is pressed downward. When the handle 22 is pressed downward, the lateral seat 223 moves upward to lift the head 31 upward. The plug packing 63 plugs the water inlet hole 45.

Referring to FIG. 2 again, the hollow head 3 is pressed downward. The plug packing 63 plugs the water inlet opening 231.

Figure 4:
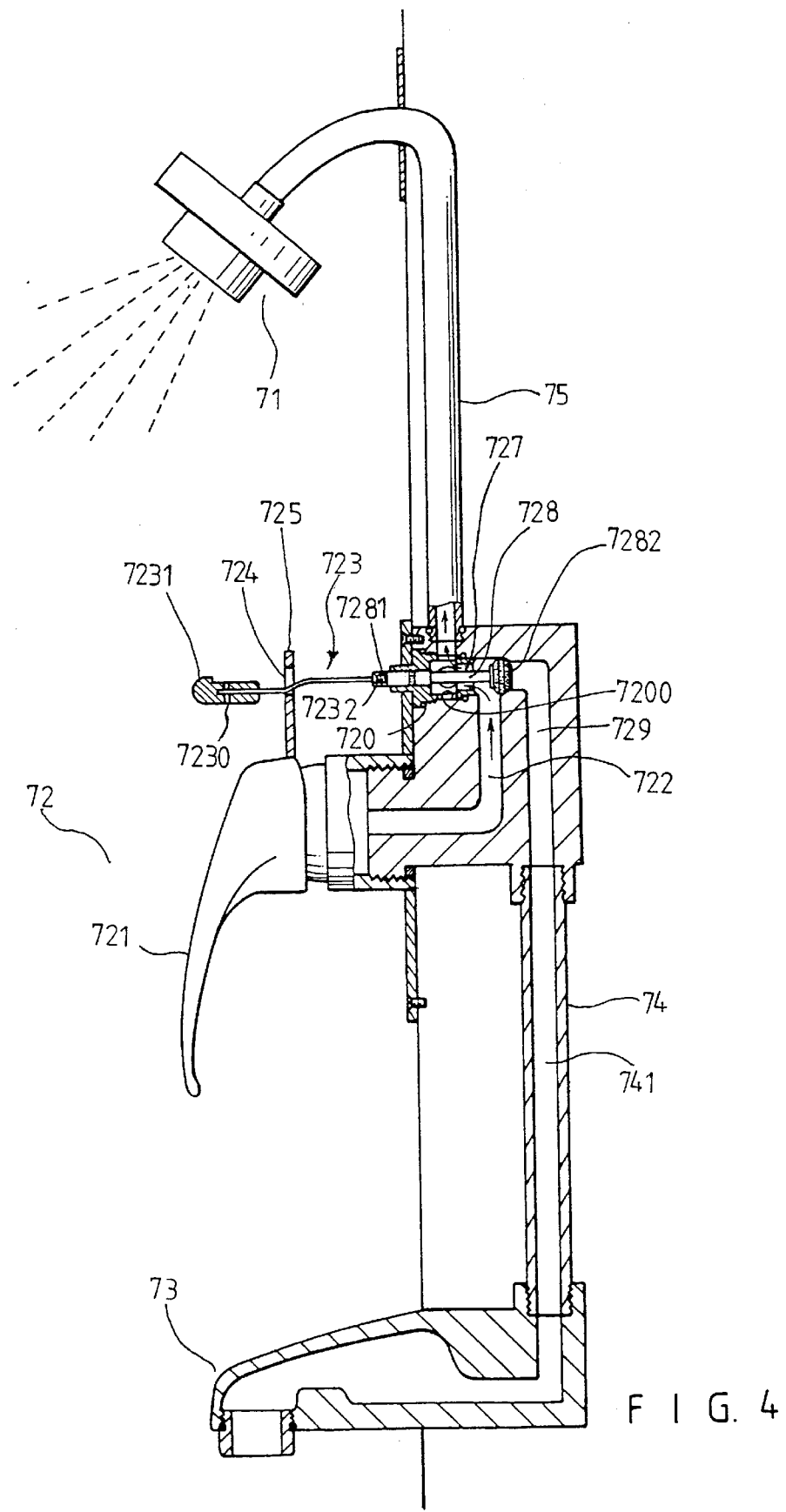
FIG. 4 is a sectional schematic view illustrating an operation of a faucet device of another preferred embodiment in accordance with the present invention.
Figure 5:
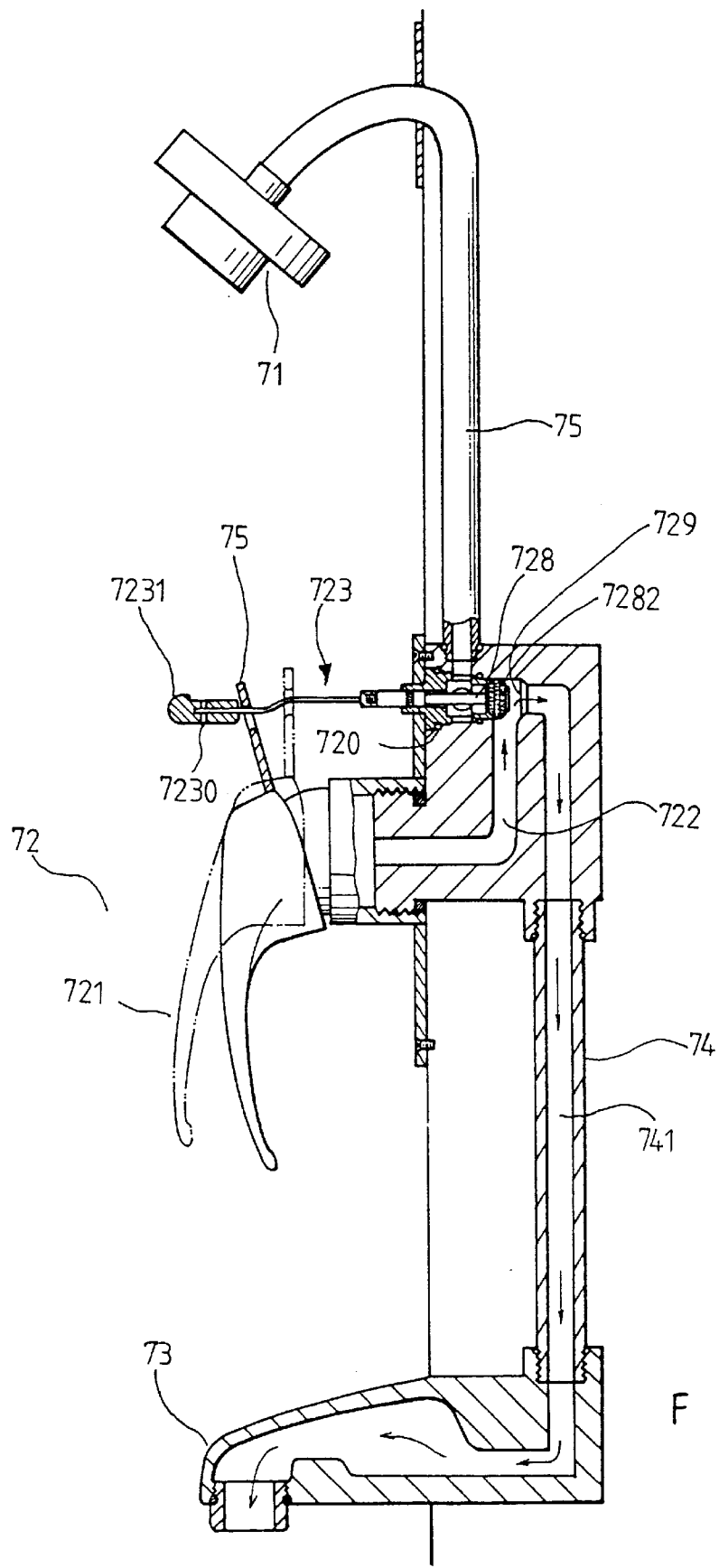
FIG. 5 is a sectional schematic view illustrating another operation of a faucet device of another preferred embodiment in accordance with the present invention.

Referring to FIGS. 4 and 5, another faucet device comprises a main body 72, a handle 721 disposed on the main body 72, a positioning hole 7200 formed on the main body 72, a water pipe 74 connected to the main body 72, a faucet 73 connected to the water pipe 74, a water passage 741 formed in the water pipe 74, a shower arm 75 connected to the main body 72, a shower head 71 disposed on a distal end of the shower arm 75, a plunger 728 inserted in the positioning hole 7200, a valve seat 720 covering the positioning hole 7200, and a control device 723 connected to the valve seat 720. The handle 721 has a lateral seat 725 and a slot hole 724. The main body 72 has a water channel 722 communicating with a water way 729. The water passage 741 communicates with the water way 729. The shower arm 75 communicates with the positioning hole 21. The plunger 728 has a threaded end 7281, and a plug packing 7282 disposed on the plunger 728. The plunger 728 is inserted through the the valve seat 4. The plug packing 7282 plugs a lower end of the valve seat 4. The control device 723 has a hollow head 7231 and a cylinder end 7232 engaging with the threaded end 7281 of the plunger 728. A pin 7230 fastens the hollow head 7231.

The invention is not limited to the above embodiment but various modification thereof may be made. Further, various changes in form and detail may be made without departing from the scope of the invention.

I claim:

1. A faucet device comprises:

a main body, a handle disposed on the main body, a positioning hole formed on the main body, a plunger inserted in the positioning hole, a valve seat covering the positioning hole, a control device connected to the valve seat, the handle having a lateral seat and a slot hole, the main body having a water outlet, a water passage communicating with the water outlet, a water inlet opening communicating with the water passage, a water channel communicating with the water inlet opening, and a water inlet hole communicating with the positioning hole, the plunger having a threaded end, a packing ring, and a plug packing disposed on a lower end of the plunger, the valve seat having a flange, a cubic portion disposed on the flange, a threaded portion formed on a periphery of the valve seat, a plurality of circular holes formed on the periphery of the valve seat, and a through hole, the plunger inserted through the through hole and an upper portion of the plunger extended out of the valve seat, a washer surrounding the threaded portion and being blocked by the flange, the plug packing plugging a lower end of the valve seat, the control device having a hollow head and a control rod, the hollow head having an interior and a pin hole, an upper portion of the control rod inserted in the interior of the hollow head, the upper portion of the control rod passing through the slot hole, the control rod having a round hole matching the pin hole and a cylinder end engaging with the threaded end of the plunger, and a pin fastening the hollow head and the control rod via the pin hole and the round hole.

2. A faucet device as claimed in claim 1, wherein a shower arm is connected to the main body and a shower head is disposed on a distal end of the shower arm.

\* \* \* \* \*